(12) United States Patent
Narula et al.

(10) Patent No.: US 10,747,552 B2
(45) Date of Patent: Aug. 18, 2020

(54) CONTEXT FRAMEWORK

(71) Applicant: SAP SE, Walldorf (DE)

(72) Inventors: Sanam Narula, Vancouver (CA); Pak Man Chan, Vancouver (CA)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 16/112,406

(22) Filed: Aug. 24, 2018

(65) Prior Publication Data

US 2019/0370024 A1 Dec. 5, 2019

Related U.S. Application Data

(60) Provisional application No. 62/680,494, filed on Jun. 4, 2018.

(51) Int. Cl.
*G06F 9/445* (2018.01)
*G06F 9/451* (2018.01)
*G06F 16/11* (2019.01)

(52) U.S. Cl.
CPC ...... *G06F 9/44594* (2013.01); *G06F 9/44521* (2013.01); *G06F 9/451* (2018.02); *G06F 16/128* (2019.01)

(58) Field of Classification Search
None
See application file for complete search history.

(56) References Cited

U.S. PATENT DOCUMENTS

| 2007/0118813 | A1* | 5/2007 | Forstall | H04M 1/72544 715/805 |
| 2010/0077328 | A1* | 3/2010 | Berg | G06F 3/0481 715/764 |
| 2011/0247031 | A1* | 10/2011 | Jacoby | H04N 21/4351 725/25 |
| 2014/0137005 | A1* | 5/2014 | Park | G06F 3/0482 715/760 |
| 2015/0154159 | A1* | 6/2015 | Yin | G06F 9/454 715/234 |
| 2017/0242892 | A1* | 8/2017 | Ali | G06F 16/958 |

* cited by examiner

*Primary Examiner* — Chat C Do
*Assistant Examiner* — William C Wood
(74) *Attorney, Agent, or Firm* — Fountainhead Law Group P.C.

(57) ABSTRACT

The presentation of data models (a story) on a mobile device having limited memory and processing resources includes instantiating widgets one at a time for interaction with a user. When the user completes their interaction, the instance of that widget is removed from memory (destroyed); widgets are therefore stateless. A context framework that manages the application of filters to widgets that comprise the story. When a filter is applied, widget snapshot images used to display corresponding widgets in a collection view can be updated to reflect state changes of affected corresponding widgets so that users can see the state changes despite the widget being stateless.

20 Claims, 11 Drawing Sheets

CONTEXT FRAMEWORK

CROSS REFERENCE TO RELATED APPLICATIONS

Pursuant to 35 U.S.C. § 119(e), this application is entitled to and claims the benefit of the filing date of U.S. Provisional App. No. 62/680,494, filed Jun. 4, 2018, the content of which is incorporated herein by reference in its entirety for all purposes.

BACKGROUND

Mobile apps can provide a user in an enterprise with access to their business data by running JavaScript code that use interactive graphical objects (elements), referred to as "widgets." The SAP Analytics® mobile app product, for example, uses the concept of "stories" that contain widgets to provide data visualization using charts, graphs, tables, and other visual elements to convey a story of the user's enterprise and help discover insights in the data.

WkWebview is a library that is used to load the JavaScript code that handle interactions with such widgets. Before loading a widget, the code needs to set up a story context. The story context contains an instantiation (WkWebview instance) of all the services that are required for the interactions and general story workflow. These services are memory intensive and processor intensive. Because of these constraints, a mobile app can load only a limited number of WkWebview instances. Depending on system architecture (such as in the SAP Analytics® mobile app) and as a practical matter, the mobile app can load only two instances of WkWebview at a time. For the same reasons, due to memory and processing load constraints, each WkWebview instance maintains only one active widget at a time. For basic usage scenarios, on a mobile device such as viewing and interacting with a single chart, this one-widget-at-a-time access may be acceptable.

However, since the story contexts in the different WkWebview instances are completely independent of each other, a consequence of maintaining one widget per WkWebview instance is that it becomes impossible for widgets in different WkWebview instances to communicate with each other when the story context in one widget changes. In the SAP Analytics® mobile app, for example, each widget can contain information that is related to the overall story. Widgets can affect other widgets when a filter is applied on them, and for some filters even the whole story context can be affected thus in turn potentially affecting all the widgets.

In a web application, on a desktop computer, for instance, all the widgets on a given page can be initialized and active at the same time in a story because there will be sufficient memory, processing, and power resources to support several WkWebview instances running several active widgets. When a filter is applied on a widget which affects other widgets on the page, an event is fired to those widgets and any changes can be rendered right away, in real time on the affected widgets.

However, in a mobile device configuration, we cannot initialize all the widgets on a given page at the same time because of the memory constraints CPU power limitation of the mobile device. The mobile device loads only one active widget selected by the user. As soon as the user completes the interaction, the widget is removed from memory so that another widget can be selected and instantiated. In cases when a user applies a filter on a widget that affects another widget, there would be no effect because the affected widget is not present in the memory (not active) and therefore cannot react to the filter. When the user activates the affected widget, changes that should have manifested in that widget due to the filter will not appear.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Embodiments in accordance with the present disclosure can present data model (story) on a mobile device that is constrained by limited memory, limited battery power, and limited processing resources. Processing in accordance with the present disclosure includes instantiating widgets, that comprise the story, one at a time for interaction with a user so as not to tax the limited resources of the mobile device. When the user completes their interaction on a given widget, the instance of that widget and its state information is removed from memory (destroyed); widgets are therefore stateless.

A collection view comprising widget snapshots (images) of widgets allows the user to select a widget, and interact with the selected widget, including applying filters. Embodiments in accordance with the present disclosure include a context framework that manages the application of filters to widgets. When a filter is applied, widget snapshot images used to display corresponding widgets in a collection view can be updated to reflect state changes of affected corresponding widgets, thus avoiding having to maintain instantiations of several widgets.

Embodiments in accordance with the present disclosure improve the function of the mobile device because the mobile device can generate a collection view that reflects the current state of widgets including effects of applied filters, despite that widgets are stateless. Embodiments in accordance with the present disclosure provide a technical improvement in mobile devices, because a mobile device needs to display snapshots (images) in order to represent the current states of widgets in a collection view rather than having to instantiate the widgets. The latter approach being a memory- and processor-intensive activity which can require so many memory and processing resources that doing so is not practical on a mobile device. Embodiments in accordance with the present disclosure therefore provide capability in a mobile device that is not possible in conventional mobile devices.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
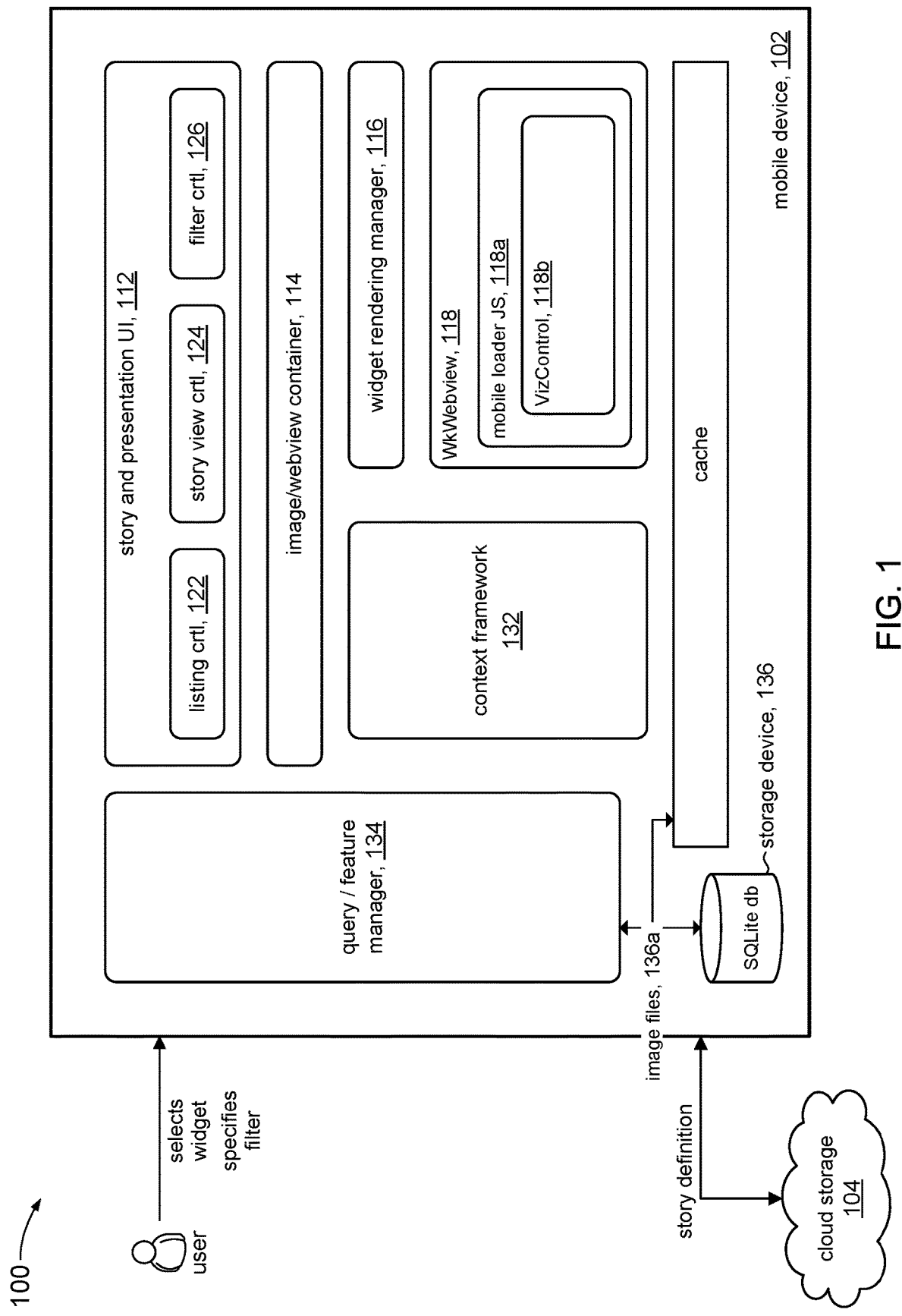
FIG. 1 is a block diagram showing components in a mobile device for presenting stories in accordance with some embodiments of the present disclosure.

FIG. 1 shows a system 100 in accordance with the present disclosure. In some embodiments, for example, the system 100 can be configured to support the presentation and interaction of "stories" by users in a enterprise. A story can be a collection of data models (e.g., bar charts, graphs, tables, and other visual elements) used for analysis, planning, and reporting in an enterprise. A story definition comprises information that defines those data models, and defines the arrangement, relationships, and visualizations of the data models to create a data-driven story that can help users in the enterprise view their data in a meaningful way. In some embodiments, the story definition can be expressed using data objects expressed in JavaScript Object Notation (JSON objects). JSON is a data format that can transmit structured data, such as chart, graphs, tables, plots, and the like that comprise the story.

The charts, graphs, tables, etc. can be viewed using widgets, which are interactive graphical elements and can also be expressed as JSON objects. For example, a widget representing a chart can be displayed on the touch-sensitive display, allowing the user to interact with elements in the chart to display or otherwise access additional chart information (e.g., by "tapping" on a chart element), to initiate an action (surf to a website, communicate with a user, etc.), and so on.

In some embodiments, the system 100 can include a mobile device 102, such as a mobile phone. However, it will be appreciated that the features, elements, and concepts of the present disclosure are not limited to mobile phones. In other embodiments, for example, the system 100 can be incorporated computer tablets, wearable devices for virtual reality or augmented reality interaction, and other similar portable devices. The system 100 can include cloud storage system 104 to provide the story definition to the mobile device 102 for a given story.

The mobile device 102 can include a story presentation user interface (UI) 112 to manage the display of story contents via widgets. When a filter is applied, the filter can affect the current states of one or several widgets. As explained in more detail below, a filter can change the story definition (referred to as a "story filter") or can change some aspect of a widget, but does not otherwise affect the story definition (referred to as a "transient filter").

In some embodiments, the story presentation UI 112 can include a collection of controls to control the display of widgets. For example, the story presentation UI 112 can include a listing controller 122 that can display a list of widgets (widget snapshots) in a collection view area (e.g., 402, FIG. 4) on the mobile device 102. The listing controller 122 can interact with the user to browse the list of widget snapshots (e.g., in a scrollable window) and to select a widget of interest (e.g., by double-tapping on the displayed widget snapshot).

The story presentation UI 112 can include a story view controller 124 can cause the selected widget to be instantiated, rendered, and then displayed in a full screen view area (e.g., 404, FIG. 4) on the mobile device 102. A filter controller 126 can manage the display of available filters that a user can apply to a widget that is presented in full screen view. The list of available filters can vary depending on the widget. The user can interact with the filter controller 126 to select a filter and cause the selected filter to be applied to the widget. This aspect of the present disclosure is described in more detail below.

The mobile device 102 can include an image/webview container 114 to maintain the lifecycle (states) of an instance of a WkWebview object 118; for example, not loaded, loading, loaded, interactions (e.g., filter being applied); and exit/unload the widget. These states indicate whether the WkWebview object 118 is getting itself ready to start processing an incoming request, whether the incoming request is in the middle of processing and whether the incoming request has been processed. The incoming request is always about loading a widget and how the widget should be loaded depending on the mode such as snapshot mode (i.e., generating snapshot), fullscreen mode (which allows interactions and applying filters).

A widget rendering manager 116 comprises logic for deciding which widgets should be rendered.

The mobile device 102 can create one or more instances of a WkWebview object 118. A WkWebview object displays interactive web content, such as for an in-app browser. A WkWebview object is a mini-web browser that points to an HTML page to render the widget. A WkWebview object can be used in accordance with the present disclosure to provide interactive widgets to view and interact with the story content.

In some embodiments, the WkWebview object 118 can include a mobile loader JS (JavaScript) component 118a and a VizControl component 118b. The VizControl component 118b is a method (process) that instantiates a widget and receives input from the user as they interact with elements in the widget. Events detected in VizControl 118b can be passed to mobile loader JS 118a, which in turn sends them to the WkWebview object 118.

The mobile device 102 can include a context framework process 132. In some embodiments, a WkWebview object 118 can pass all events to the context framework 132. In accordance with the present disclosure, the context framework 132 can listen for certain events from the WkWebview object 118 to trigger re-rendering of the widget in full screen view as needed. This aspect of the present disclosure is described in more detail below.

A query/feature manager 134 in the mobile device 102 is responsible for storing and retrieving image files 136a to and from a storage device 136. The image files 136a can be displayed as widget snapshots in the collection view by the listing controller 122. The storage device 136 can be any suitable data store. In some embodiments, for example, the storage device 136 can be a solid state drive (SSD).

Figure 2A:
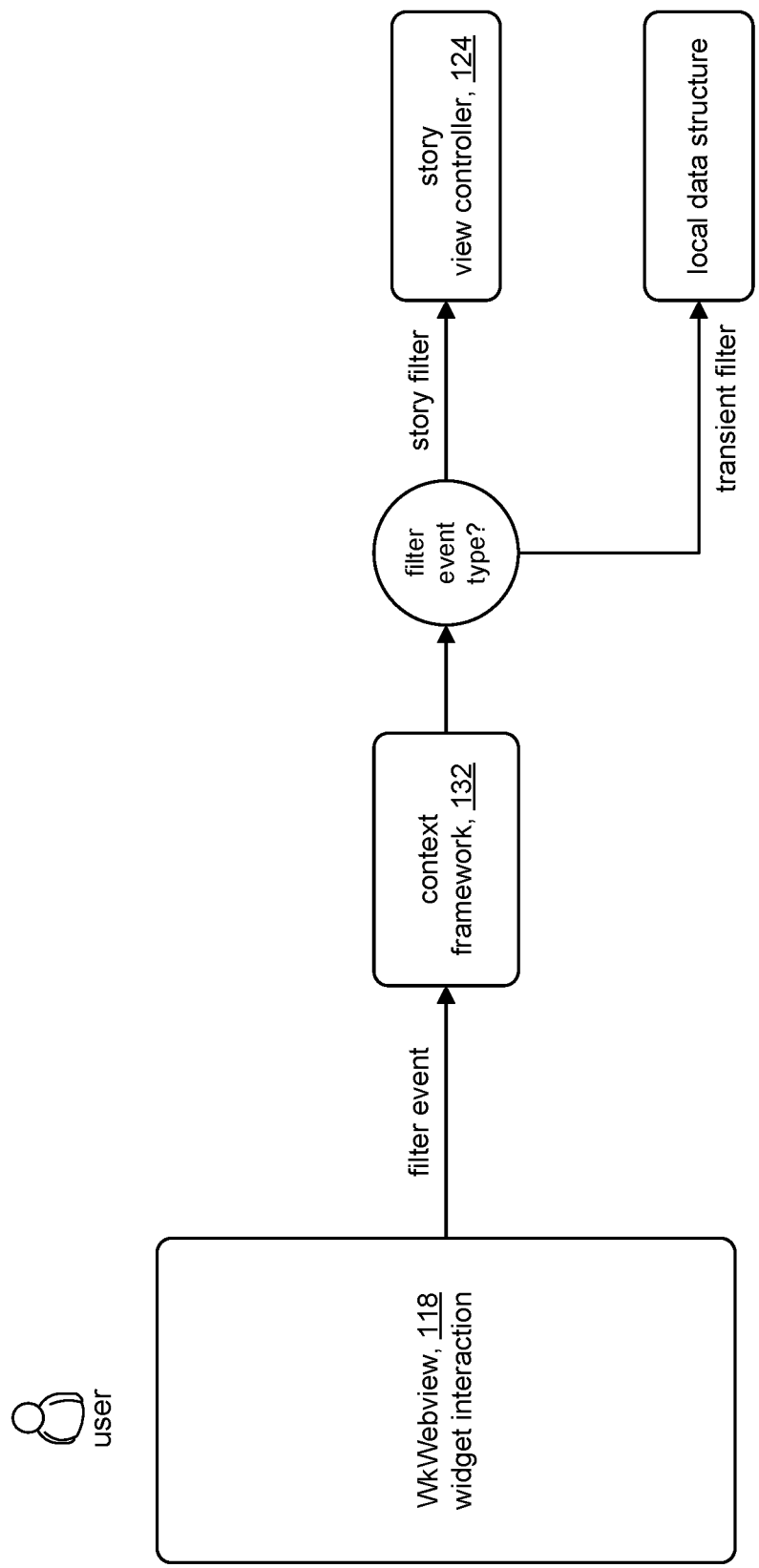
FIGS. 2A and 2B illustrate a workflow in the mobile device of FIG. 1.

FIG. 2A shows a high level workflow among various elements of mobile device 102 in accordance with some embodiments. The discussion here provides a general idea of processing that can take place in the mobile device 102 in accordance with various embodiments of the present disclosure. Processing details are discussed below. WkWebview 118 can instantiate a widget (e.g., bar chart, graph, etc.) and render the instantiated widget in a full screen view. WkWebview 118 can mediate interactions between a user and the instantiated widget. User interactions include the user selecting a filter and the applying the filter. In response, WkWebview 118 can fire a filter event to the context framework 132. The context framework 132 can process the filter in accordance with the present disclosure. If the filter event involves a story filter, the context framework 132 can signal the story view controller 124 to re-render the widget in the full screen view. If the filter event involves a transient filter, the context framework 132 can store the transient filter in a local data structure.

Figure 2B:
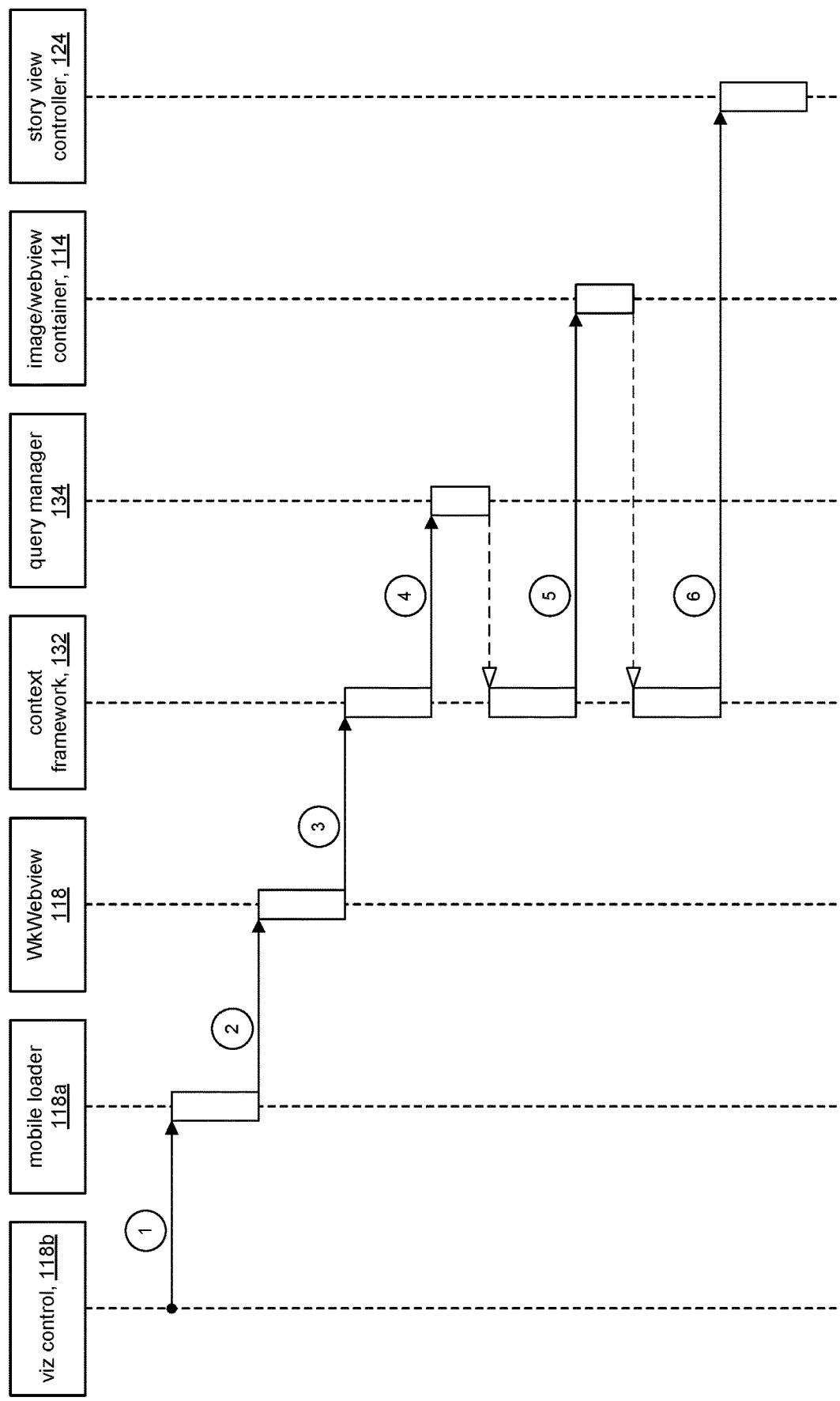

FIG. 2B shows a sequence diagram of communication among the elements of mobile device 102 to illustrate an example of triggering re-rendering of a widget in response to a filter event in accordance with the present disclosure. Sequence numbers are shown in the figure with circles. At sequence 1, the VizControl component 118b reads input from the user, and can trigger a filter event when the user indicates to apply a selected filter, for example, by double-tapping on a selected filter or activating a filter using a dropdown menu and so on. At sequence 2, the mobile loader 118a can receive the filter event and send it to its native container, WkWebview 118. At sequence 3, WkWebview 118 receives the filter event and passes (fires) it off to the context framework 132.

At sequence 4, the context framework 132 can determine the subsequent course of action depending on whether the filter event involves a story filter or a transient filter. In accordance with the present disclosure, for a story filter, the context framework 132 can simply update the story definition with the story filter. In the case of a transient filter, the transient filter can be stored in a local data structure. These aspects of the present disclosure are discussed in more detail below.

Continuing with sequence 4, the context framework 132 can notify the query manager 134 to delete the image file associated with the widget on which the filter is applied. At sequence 5, the context framework 132 can notify the image/webview container 114 to reset WkWebview 118 to set up for another round of rendering. At sequence 6, the context framework 132 can notify the story view controller 124 to perform re-rendering.

Figure 3:
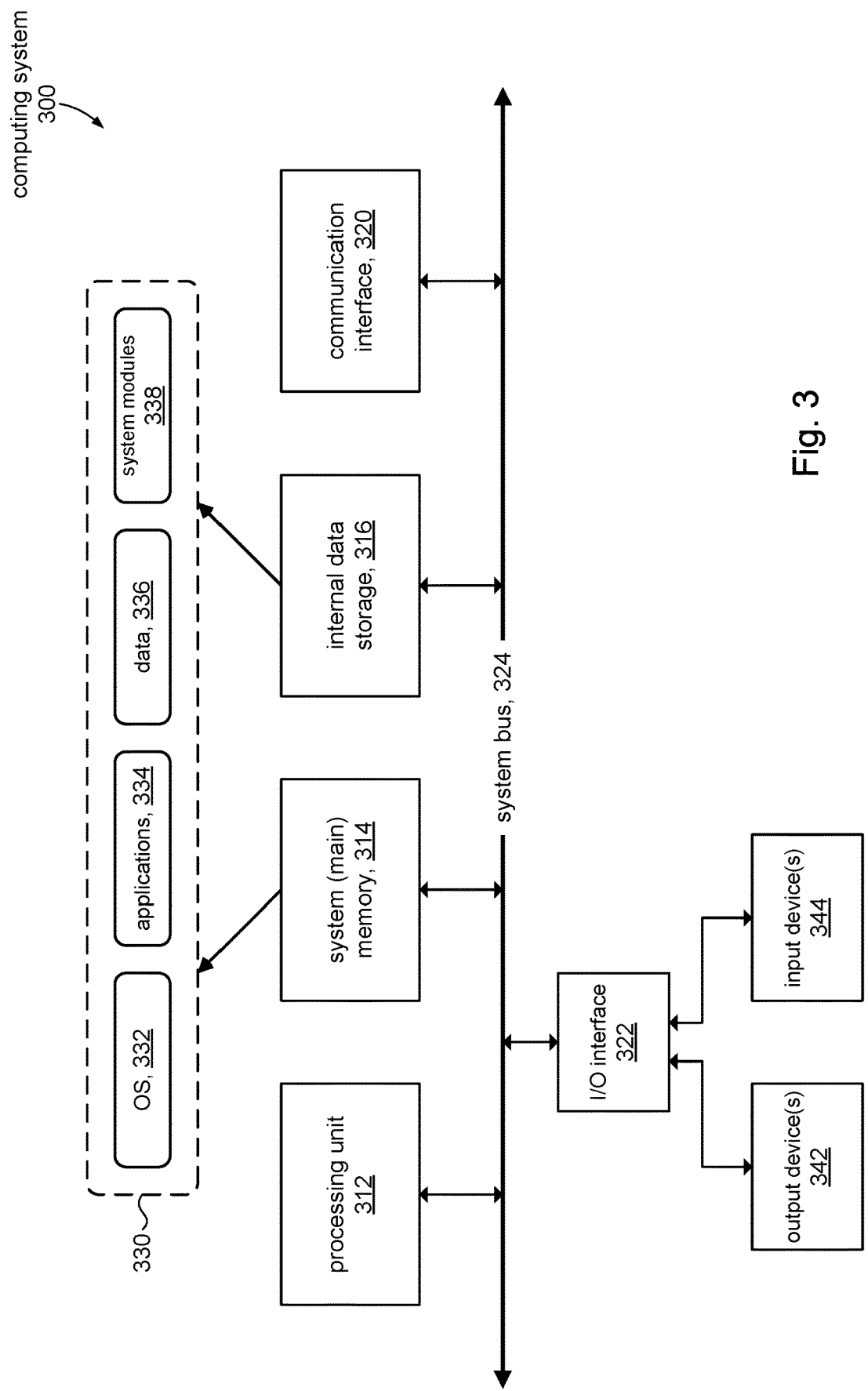
FIG. 3 shows an illustrative embodiment of a computer architecture for a mobile device in accordance with the present disclosure.

FIG. 3 is a simplified block diagram of an illustrative computing system 300 for implementing one or more of the embodiments described herein (e.g., mobile device 102, FIG. 1). The computing system 300 can perform and/or be a means for performing, either alone or in combination with other elements, operations in accordance with the present disclosure. Computing system 300 can also perform and/or be a means for performing any other steps, methods, or processes described herein.

Computing system 300 can include any single- or multi-processor computing device or system capable of executing computer-readable instructions. In a basic configuration, computing system 300 can include at least one processing unit 312 and a system (main) memory 314.

Processing unit 312 can comprise any type or form of processing unit capable of processing data or interpreting and executing instructions. The processing unit 312 can be a single processor configuration in some embodiments, and in other embodiments can be a multi-processor architecture comprising one or more computer processors. In some embodiments, processing unit 312 can receive instructions from program and data modules 330. These instructions can cause processing unit 312 to perform operations in accordance with the various disclosed embodiments of the present disclosure, e.g., FIGS. 7, 8, 10, 11.

System memory 314 (sometimes referred to as main memory) can be any type or form of storage device or storage medium capable of storing data and/or other computer-readable instructions, and comprises volatile memory and/or non-volatile memory. Examples of system memory 314 include any suitable byte-addressable memory, for example, random access memory (RAM), read only memory (ROM), flash memory, or any other similar memory architecture. Although not required, in some embodiments computing system 300 can include both a volatile memory unit (e.g., system memory 314) and a non-volatile storage device (e.g., data storage 316).

In some embodiments, computing system 300 can include one or more components or elements in addition to processing unit 312 and system memory 314. For example, as illustrated in FIG. 3, computing system 300 can include internal data storage 316, a communication interface 320, and an I/O interface 322 interconnected via a system bus 324. System bus 324 can include any type or form of infrastructure capable of facilitating communication between one or more components comprising computing system 300.

Internal data storage 316 can comprise non-transitory computer-readable storage media to provide nonvolatile storage of data, data structures, computer-executable instructions, and so forth to operate computing system 300 in accordance with the present disclosure. For instance, the internal data storage 316 can store various program and data modules 330, including for example, operating system 332, one or more application programs 334, program data 336, and other program/system modules 338 that implement the various components comprising mobile device 102 shown in FIG. 1, and to support and perform various processing and operations disclosed herein.

Communication interface 320 can include any type or form of communication device or adapter capable of facilitating communication between computing system 300 and one or more additional devices. For example, in some embodiments communication interface 320 can facilitate communication between computing system 300 and cloud storage 104 (FIG. 1) over a private or public network.

Computing system 300 can also include at least one output device 342 (e.g., a touch-sensitive display) coupled to system bus 324 via I/O interface 322, for example, to provide access to a user of the mobile device 102. The output device 342 can include any type or form of device capable of visual and/or audio presentation of information; e.g., collection view 402 (FIG. 4) and full screen view 404 (FIG. 4).

Computing system 300 can also include at least one input device 344 coupled to system bus 324 via I/O interface 322. Input device 344 can include any type or form of input device capable of providing input, either computer or human generated, to computing system 300.

Figure 4:
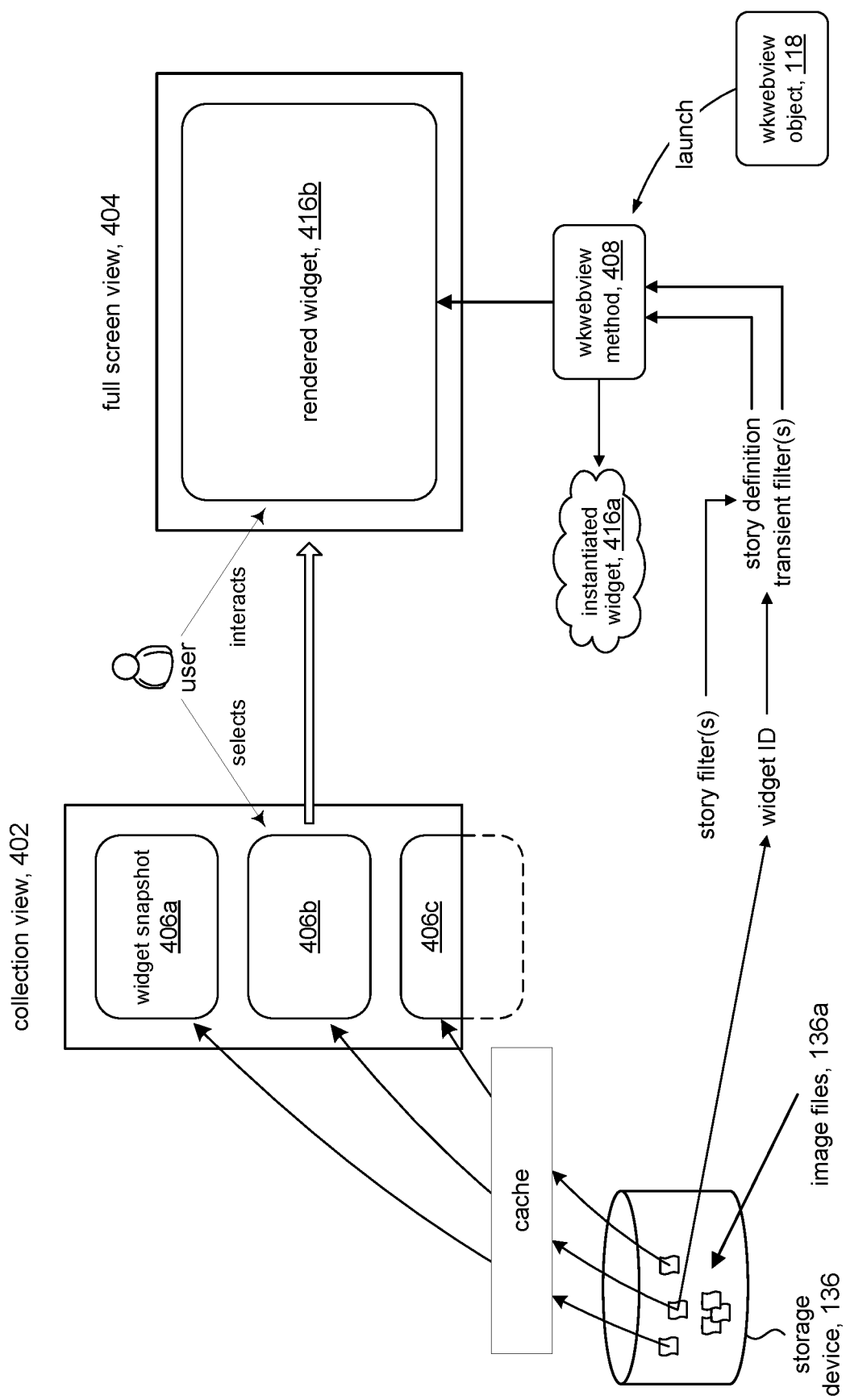
FIG. 4 illustrates an example of a collection view and full screen view that can be presented on a mobile device in accordance with the present disclosure.

Referring to FIG. 4, widgets that comprise a story can be shown in a collection view 402 and in full screen view 404. In collection view 402, the mobile device 102 can display widgets as widget snapshots. In accordance with the present disclosure, for example, the collection view 402 can display a list of widget snapshots 406a, 406b, and 406c (shown partially) which are static images representing the current state of their corresponding widgets, rather than displays of active instantiations of the widgets themselves. On a mobile device 102 or other device that has limited system memory and processing power, displaying a list of widget snapshots 406a-406c (i.e., images) can significantly improve performance in the mobile device 102 in terms of memory pressure and processing load as compared to having resource-intensive active widgets executing on the mobile device 102.

In some embodiments, the widget snapshots 406a-406c can be stored on storage device 136 as image files 136a. The image files 136a can be maintained in a database such as SQLite, for example; although it will be appreciated that the image files 136a can be stored using any suitable technique. Image files 136a can be retrieved from the storage device 136 and cached for fast access for display in the collection view 402 as widget snapshots 406a-406c. The collection view 402 can include a scroll bar or other means to allow a user to scroll through the different widget snapshots 406a-406c.

In some embodiments, the collection view 402 shows widgets in groups called pages. The user can swipe right or swipe left to select a page. A user can interact with the collection view 402 to select a widget in a given page for further inspection, for example, by tapping on one of the widget snapshots 406a-406c. In response to selection of a widget (e.g., 406b), the mobile device 102 can instantiate a WkWebview object 118, which in turn can launch/create an instance of WkWebview method 408 (widget handler). The WkWebview method 408 can instantiate the corresponding widget 416a, for example, using the widget ID associated with the selected widget snapshot 406b to access information from the story definition and any applicable transient filters. The WkWebview method 408 can render the instantiated widget 416a for display in a full screen view 404 on the mobile device 102. The WkWebview method 408 can receive input from the user interacting with the rendered widget 416b to interact with the instantiated widget 416a.

As noted above, a widget snapshot represents the current state of a widget. Depending on the context of the discussion, the "state" of a widget can refer to the information that is used to define the widget. Such state information determines how the widget will appear when it is rendered, and so, in other contexts the state of a widget can refer to its visual appearance when displayed by the mobile device 102. Consider for example a widget for a bar chart. The state of the widget can refer to substantive state information such as the source(s) of the data used to generate the bar chart (e.g., sales data for Canada, sales data for U.S., etc.), units of measure to represent the data (e.g., currency is expressed in US dollars or in Canadian dollars, etc.), and so on. Such information affects the substantive information that is presented in the bar chart widget. The state of the widget can also refer to state information that determines how the bar chart is visually depicted, such as color, size of the bars, sorting order, resolution (e.g., tick marks on the graph represent hundred dollar increments, thousand dollar increments, etc.), and so on. The state of the widget also reflects changes due to application of various filters, which can be reflected in its visual appearance.

Story Filters

Filters can affect the current state of a widget. A filter specifies a change to the state information that defines the widget and can affect the rendering of the widget. Suppose, for example, a story definition includes a bar chart widget definition that specifies to display sales figures expressed in Canadian dollars. The current state of the chart as depicted in the widget snapshot would show monetary units in Canadian dollars. A filter that changes the monetary unit to Japanese yen, for example, would affect the current state of that widget, and the corresponding widget snapshot in the collection view 402 should now be expressed in yen. This example of a filter is referred to as a story filter because it updates or otherwise changes some aspect of the story definition. A story filter applies to the whole story, and thus can affect all widgets in the story. A story filter can be a JSON object that replaces existing widgets in the story definition, modify existing widgets, or defines new widgets.

Transient Filters

Figure 5:
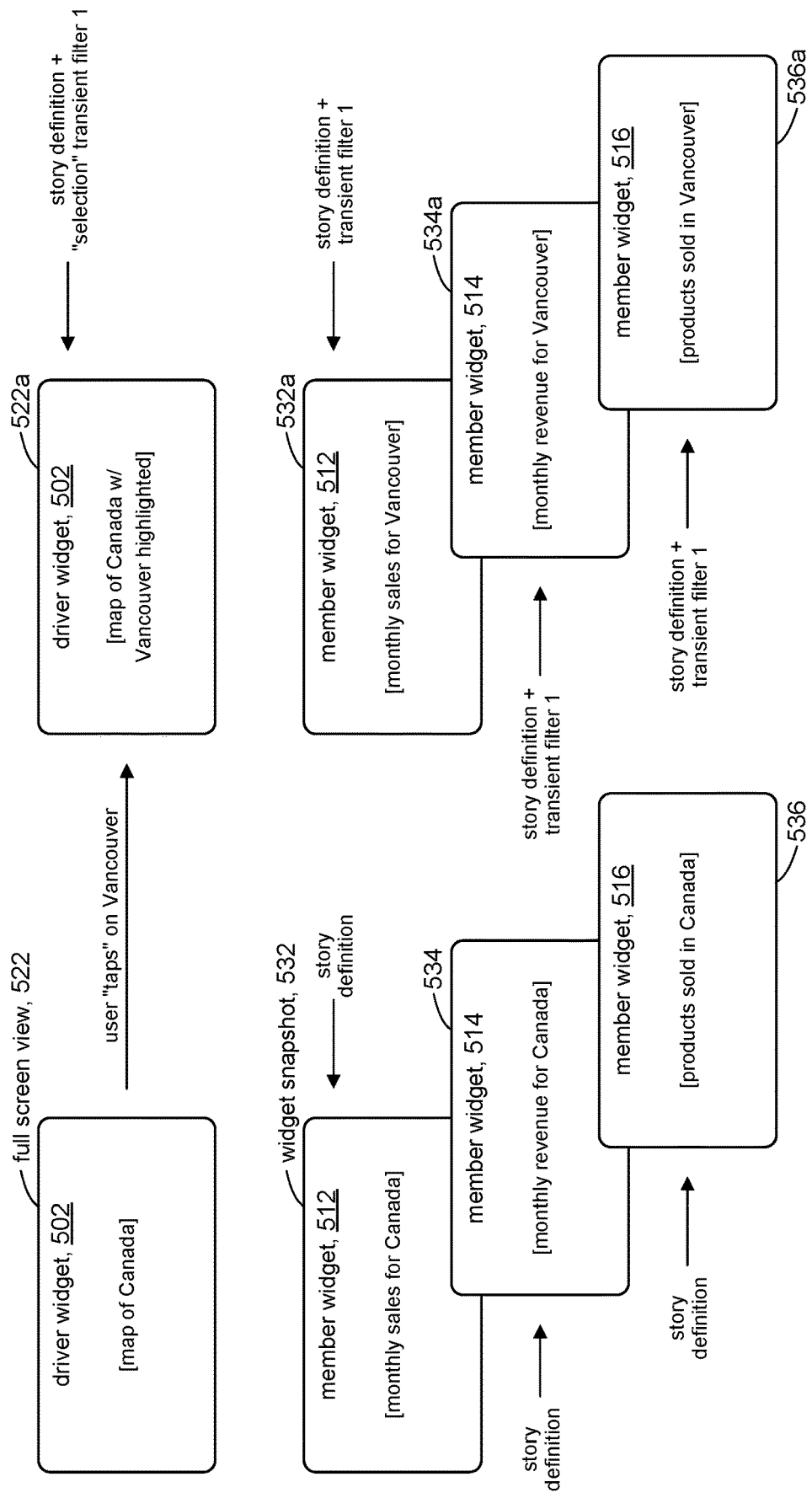
FIG. 5 illustrates transient filters.

Referring to FIG. 5, a filter can be specific to the rendered widget and can generate filters that affect one or more widgets related to the rendered widget, but does not otherwise affect the story definition. Such filters can be referred to as transient filters. The behavior of transient filters can be explained with reference to the example shown in FIG. 5. Suppose a widget 502 (referred to as a driver widget) shows a map of Canada in full screen view 522. Widget snapshots 532, 534, 536 for a set of related respective widgets 512, 514, 516 (referred to as member widgets) may depict various data relating to Canada. Widget snapshot 532 may represent monthly sales for the whole of Canada (e.g., via bar chart) over a given period of time. Widget snapshot 534 may represent monthly revenues and widget snapshot 536 may represent products sold in Canada over that period of time.

Suppose a user taps on the city of Vancouver in the full screen view 522 of driver widget 502. In response, the system can generate a selection-type transient filter that creates a rendered widget in full screen view 522a to show that Vancouver has been selected; for example, by highlighting the graphic of Vancouver. In some embodiments, for example, the transient filter that is applied to the driver widget 502 can be JSON object that includes code that produces a highlighted graphic of Vancouver.

Transient filters may be generated for member widgets 512, 514, 516 based on Vancouver being selected. In accordance with the present disclosure, the corresponding widget snapshots 532a, 534, 536a can be updated to reflect the effects of these transient filters to now depict information for Vancouver instead Canada as a whole. In some embodiments, for example, the transient filters can be JSON objects that further specify using data for Vancouver instead of Canada, and how to generate labels (e.g., on bar charts, graphs, etc.) and other text that refer to Vancouver instead of Canada.

The filters are "transient" in the sense that they have not affected the story definition. For example, the filter for driver widget 502 simply specifies which element in the rendered full screen view 522a of the widget is highlighted, namely Vancouver. Similarly, the filters applied to the member widgets 512, 514, 516 are transient because they will change depending on what is selected in the driver widget. This aspect of the present disclosure is discussed in more detail below.

The discussion will now turn to various operations in the mobile device 102 to introduce additional details in accordance with the present disclosure.

Collection View

Figure 6:
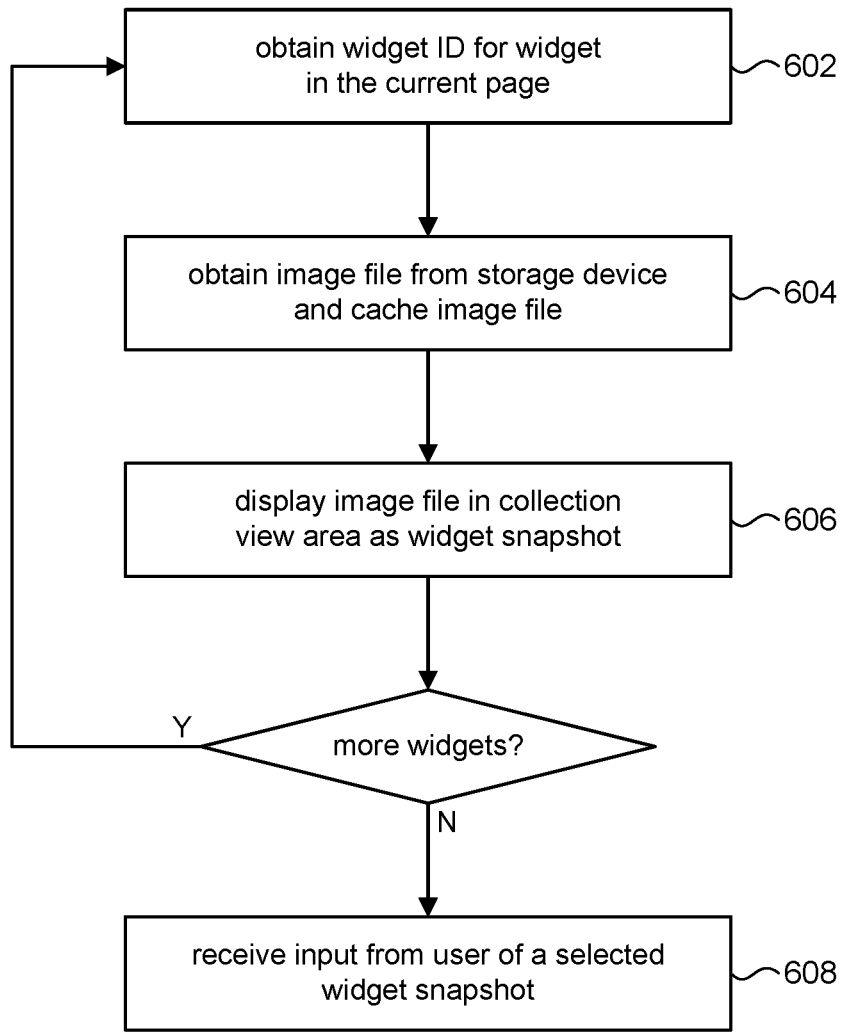
FIG. 6 illustrates processing of a collection view in a mobile device in accordance with the present disclosure.

Referring to FIG. 6 and other figures, the discussion will now turn to a high level description of operations and processing in the mobile device 102 (e.g., via the story and presentation UI 112) to display a collection of widgets that comprise a story in accordance with the present disclosure. In some embodiments, for example, the mobile device can include computer executable program code, which when executed by its processor (e.g., 312, FIG. 3), can cause the mobile device to perform processing in accordance with FIG. 6. The operation and processing blocks described below are not necessarily executed in the order shown, and can be allocated for execution among one ore more concurrently executing processes and/or threads.

At block 602, the mobile device can obtain widget IDs for the widgets for the current page.

At block 604, the mobile device can obtain the image file 136a from the storage device identified by or otherwise associated with the widget ID, and cache the image file for faster subsequent retrieval of the image file. In some embodiments, for example, the mobile device 102 can use the widget IDs to query the SQLite database in storage device 136 and access the image file.

At block 606, the mobile device can display the image file as a widget snapshot in a collection view (e.g., 402, FIG. 4) on a display unit of the mobile device such as, for example, a touch sensitive display. Since the collection view area can only display a limited number of widget snapshots, the image files 136a corresponding to widgets that are not displayed can remain cached in memory and later displayed, for example, when the user performs a scroll action in the collection view. Processing can return to block 602 to read in and cache additional image files 136a in the current page. Otherwise, processing can continue to block 608.

At block 608, the mobile device can receive and process input from the user. For example, the user can scroll through the widget snapshots in the collection view to view the list of widgets. In response to a selected input (e.g., a double tap) on a particular widget snapshot, the mobile device can bring up a full screen view of the widget that corresponds to the selected widget snapshot. Processing to bring up a full screen view in accordance with the present disclosure is discussed below.

Full Screen View

Figure 7:
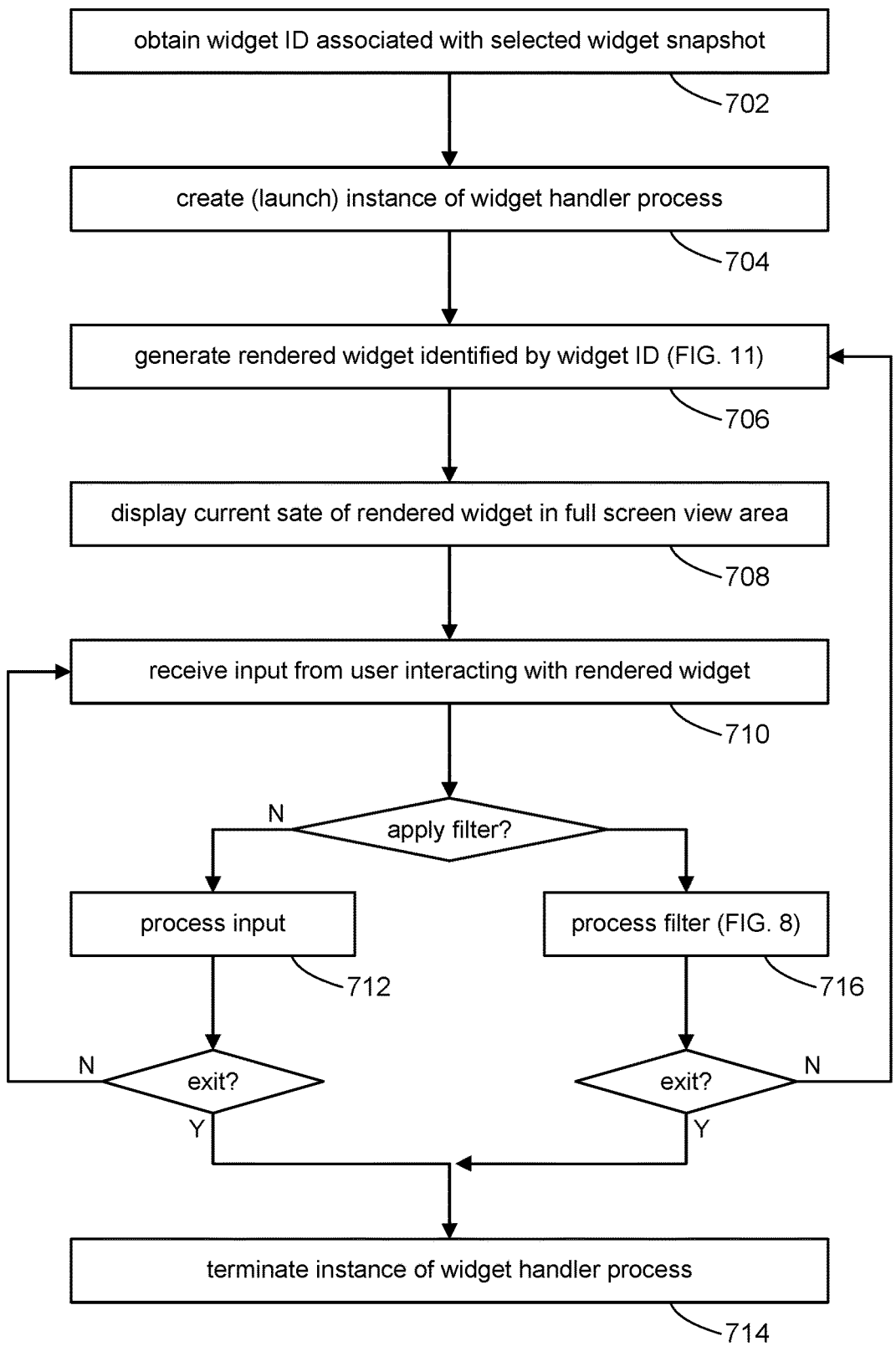
FIG. 7 illustrates processing of full screen view in a mobile device in accordance with the present disclosure.

Referring to FIG. 7 and other figures, the discussion will now turn to a high level description of operations and processing in the mobile device 102 (e.g., via the story and presentation UI 112) to present an interactive widget in accordance with the present disclosure. The processing in FIG. 7 picks up from block 610 in FIG. 6, where the user had selected a widget snapshot from the collection view to be displayed in full screen view. In some embodiments, the mobile device can include computer executable program code, which when executed by its processor (e.g., 312, FIG. 3), can cause the mobile device to perform processing in accordance with FIG. 7. The operation and processing blocks described below are not necessarily executed in the order shown, and can be allocated for execution among one ore more concurrently executing processes and/or threads.

At block 702, the mobile device can receive or otherwise obtain the widget ID associated with the selected widget snapshot. In some embodiments, for example, the widget ID can be obtained from metadata associated with the image file corresponding to the selected widget snapshot displayed in the collection view area (block 610, FIG. 6).

At block 704, the mobile device can create or launch an instance of a widget handler process to instantiate the selected widget identified by the widget ID. In some embodiments, for example, the mobile device can instantiate a WkWebview object 118 where the widget handler process is a method in the instantiated WkWebview object.

At block 706, the widget handler process can generate a rendering of the current state of an instantiation of the selected widget. The current state of the widget depends on the story definition and any transient filters applied on or which otherwise affect that widget. The rendered widget shown in full screen view reflects the current state of the selected widget, taking into account the current story definition and any applicable transient filters. This aspect of the present disclosure is discussed in more detail below.

At block 708, the widget handler process can display the rendered widget in a full screen view area (e.g., 404, FIG. 4) on the mobile device. In some embodiments the full screen view can use the entire displayable area of the mobile device. In other embodiments, the full screen view can share the displayable area with the collection view.

At block 710, the widget handler process can receive input from a user interacting with the rendered widget. The widget handler process is the process behind the rendered widget that listens for user input, such as touch input from a touch screen for example. If the input specifies to apply a filter on the widget, then processing can proceed to block 716 to apply a selected filter. Otherwise processing can proceed to block 712 to process other user inputs.

At block 712, the widget handler process can respond to the user's input to interact with the rendered widget. For example, the user can tap on elements shown on the rendered object to display additional information associated with that element. Some filter-related input can include the user calling up a list of filters (e.g., via drop down menu) and selecting a filter.

At block 714, the widget handler process can terminate. For example, the user can exit from full screen view when they are done examining the selected widget and return to collection view. The mobile device can terminate the widget handler process, and by doing so removes (destroys) the instance of the selected widget from memory. Widgets are therefore deemed to be stateless because when their instantiations are destroyed, the state of the widget is also removed and does not persist. However, as will be explained below, when the user returns to the collection view to view the snapshots of other widgets the widget snapshots will nonetheless show the current states of those widgets, reflecting the effects of any applied filters, even though widgets are stateless.

At block 716, the widget handler process can signal an event to cause the selected filter to be applied on the rendered widget. In some embodiments, for example, the widget handler process can fire a filter event to the context framework 132 (FIG. 1) to initiate processing the filter in accordance with the present disclosure, which is discussed in more detail below. If the user exits the full screen view, processing can proceed to block 714. If the user remains in full screen view, the widget handler process can continue from block 706 to re-render (including re-instantiating) the widget in full screen view to reflect its current state taking into account the applied filter.

Figure 8:
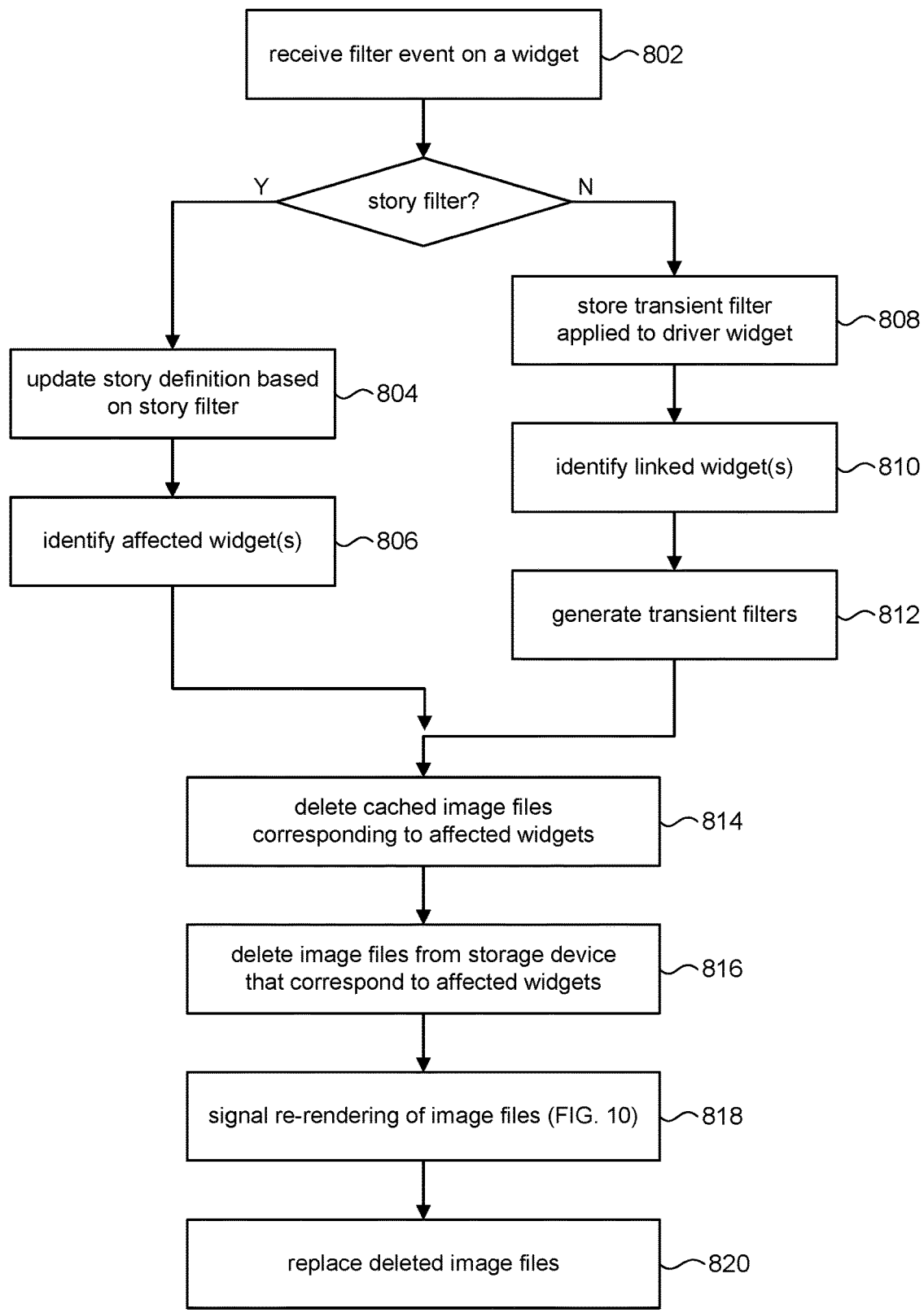
FIG. 8 illustrates processing a filter applied on a widget in accordance with the present disclosure.

Referring to FIG. 8 and other figures, the discussion will now turn to a high level description of operations and processing in the mobile device 102 (e.g., using the context framework process 132) to process a filter in accordance with the present disclosure. In some embodiments, the mobile device can include computer executable program code, which when executed by its processor (e.g., 312, FIG.

3), can cause the mobile device to perform processing in accordance with FIG. 8. The operation and processing blocks described below are not necessarily executed in the order shown, and can be allocated for execution among one ore more concurrently executing processes and/or threads.

At block 802, the mobile device can begin processing a received filter event, for example, in response to a user applying a filter on a rendered widget in full screen view. The filter associated with the filter event can be a story filter (processed at block 804) or a transient filter (processed at block 808).

At block 804, the mobile device can process a story filter. In some embodiments, for example, the context framework can update the story definition according to the story filter. In some embodiments, for example, the story filter can be a JSON object, which when executed can modify the story definition. In some embodiments, the updated story definition can remain in the mobile device. In other embodiments, the mobile device can upload the updated story definition to an external server (e.g., cloud server 104).

At block 806, the mobile device can identify any widgets affected by the story filter. In some embodiments, the widgets that comprise a story can be grouped into data sets. A story filter can specify or otherwise identify the data set of widget to which it is applied, thus identifying the affected widgets. Processing can proceed to block 812.

Figure 9:
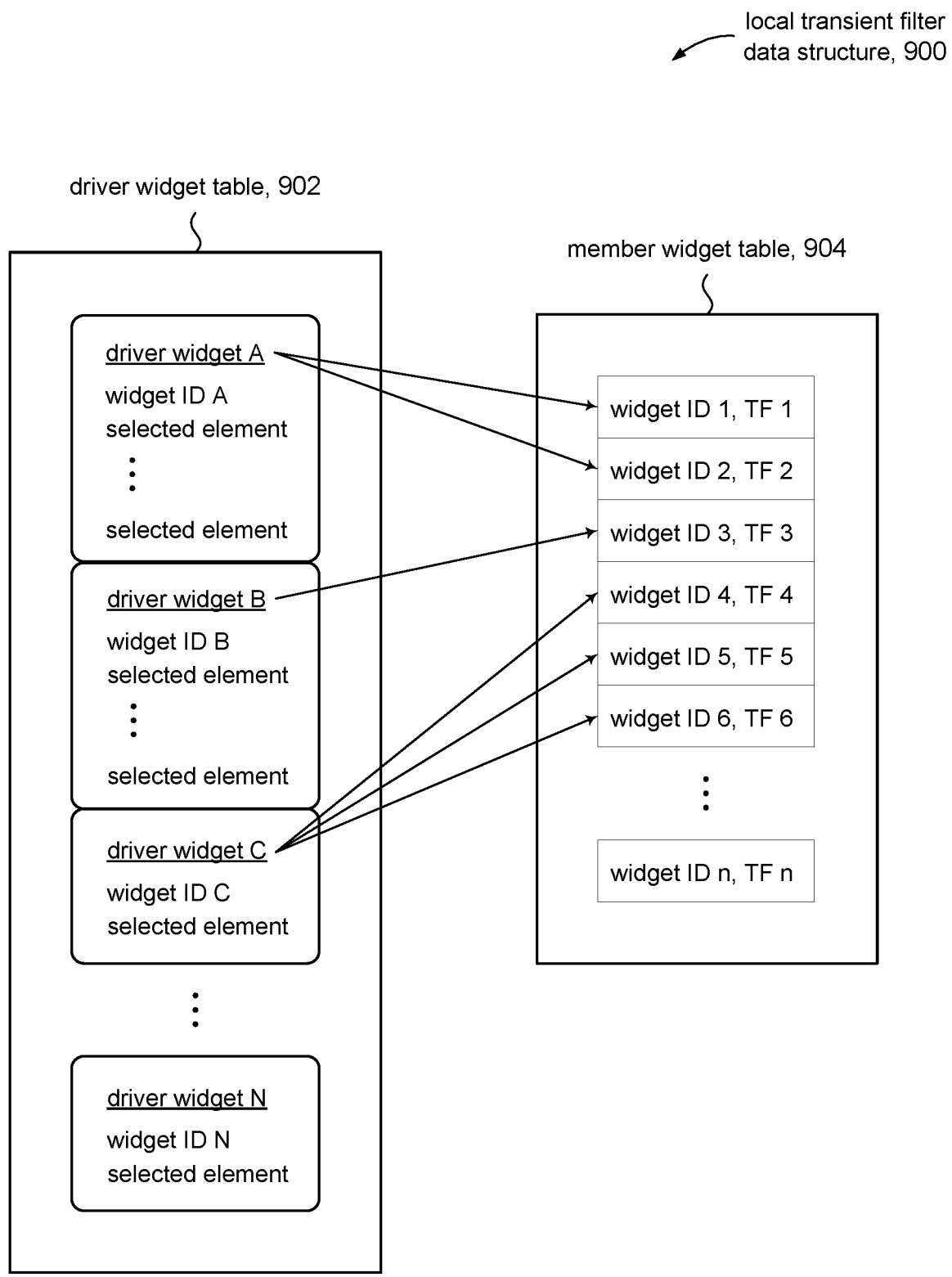
FIG. 9 shows a local data structure for storing transient filters, in accordance with some embodiments of the present disclosure.

At block 808, the mobile device can store the transient filter that is applied on the rendered widget (block 716, FIG. 7). An example of a transient filter is a selection filter that selects one or more elements in the rendered widget. The selection filter can be used to re-render the widget including highlighting the selected element(s). As noted above, transient filters, such as a selection filter, do not affect the story definition. Accordingly, in accordance with the present disclosure transient filters are stored separate from the story definition. Referring to FIG. 9, for example, in some embodiments, the mobile device can maintain a local transient filter data structure 900 to manage the storage of transient filters without affecting the story definition. The local transient filter data structure 900 can include a driver widget table 902 to store a widget ID of the rendered widget to which the transient filter was applied. The driver widget table 902 stores identifiers to elements in the driver widget that were selected by the user. The driver widget table 902 allows the widget to reflect its current state when re-rendered.

At block 810, the mobile device can identify widgets (member widgets) that are affected by the driver widget. In some embodiments, for example, linked analysis can be used to identify one or more member widgets (e.g., 512, 514, 516, FIG. 5).

At block 812, the mobile device can generate transient filters for each identified member widget based on one ore more elements in the driver widget selected by the user. In accordance with some embodiments, the transient filters can be generated based on one or more of the selected elements in the driver widget. Referring for a moment to FIG. 9, the local transient filter data structure 900 further includes a member widget table 904 that stores the widget IDs of linked widgets and their corresponding generated transient filters.

At block 814, the mobile device can clear any cached image files that correspond to affected widgets (e.g., identified at block 808). Since the states of those widgets may be affected, their corresponding image files may no longer be representative of their current state and so can be cleared from the cache.

At block 816, the mobile device can likewise delete the image files that correspond to the affected widgets, since the states of the corresponding widgets may no longer be reflected in the image files.

At block 818, the mobile device can signal re-rendering of the deleted images files as a background process. For example, at blocks 804 and 816, the mobile device (e.g., the context framework) updates the story definition and deletes the image files (widget snapshots). When the user exits full screen view and returns to the collection view, the images to display the widget snapshots of the affected widgets in the collection view are no longer present. The mobile device can signal re-rendering of the deleted images files, in response. The updated story definition will be used to generate the widget snapshot which will ensure that it will have the latest and correct information. In some embodiments, for example, the context framework 132 can signal the image/webview container 114 to cause re-rending of the deleted image files.

At block 820, the mobile device can replace the deleted image files in collection view. For example, when the user exits full screen view and returns to the collection view, the image files for widget snapshots of the affected widgets in the collection view will have been deleted. Accordingly, the mobile device can replace the cleared image with a suitable replacement image while the cleared image is being re-rendered (block 818). For example, when the user scrolls through the collection and reaches an image that has been cleared from the cache, the replacement image can be a loading animation. It can be appreciated that any suitable replacement image can be used.

Figure 10:
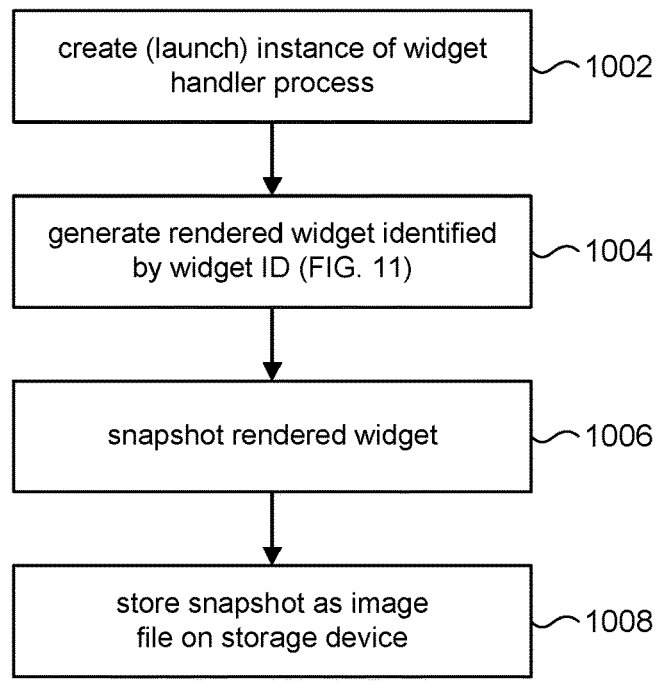
FIG. 10 shows a process for re-rendering widget snapshots in accordance with the present disclosure.

Referring to FIG. 10 and other figures, the discussion will now turn to a high level description of operations and processing in the mobile device 102 (e.g., in the widget rendering manager 116) to re-render a widget snapshot in accordance with the present disclosure. The processing in FIG. 10 picks up from block 612 in FIG. 6, where the mobile device signals re-rendering of the image file for a widget identified by its widget ID. In some embodiments, the mobile device can include computer executable program code, which when executed by its processor (e.g., 312, FIG. 3), can cause the mobile device to perform processing in accordance with FIG. 8. The operation and processing blocks described below are not necessarily executed in the order shown, and can be allocated for execution among one ore more concurrently executing processes and/or threads.

At block 1002, the mobile device can create or launch an instance of a widget handler process to instantiate the widget identified by the widget ID. In some embodiments, for example, the mobile device can instantiate a WkWebview object 118 where the widget handler process is a method in the instantiated WkWebview object.

At block 1004, the mobile device can generate a rendering of the current state of widget identified by the widget ID. The current state of the widget depends on the story definition and any transient filters applied on or which otherwise affect that widget. The rendered widget reflects the current state of the widget, taking into account the current story definition and any applicable transient filters. This aspect of the present disclosure is discussed in more detail below.

At block 1006, the mobile device can generate a snapshot of the rendered widget to create an image of the current state of the rendered widget.

At block 1008, the mobile device can store the snapshot as an image file on the storage device of the mobile device, thus re-creating the deleted image file (e.g., at block 812, FIG. 8). In some embodiments, the mobile device can cache the re-created image file to provide fast access for the collection view.

Figure 11:
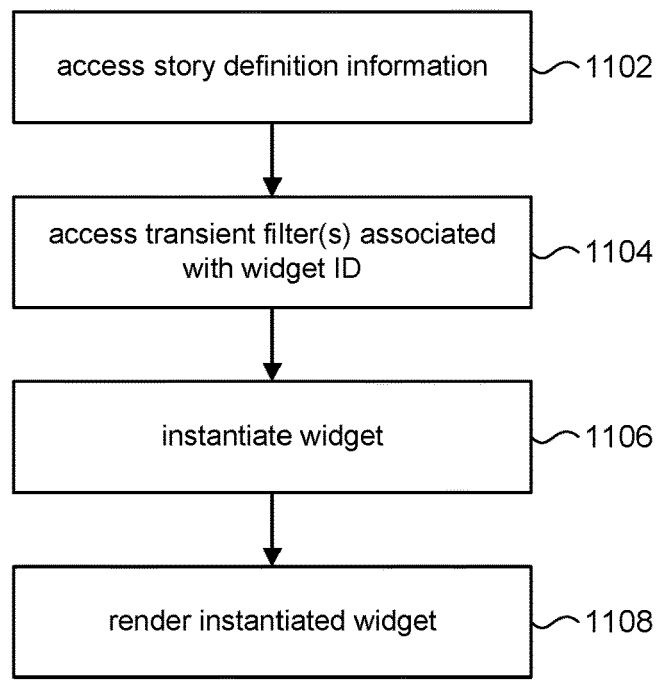
FIG. 11 shows a process for rendering an instantiated widget I accordance with the present disclosure.

Referring to FIG. 11 and other figures, the discussion will now turn to a high level description of operations and processing in the mobile device 102 (e.g., in the widget rendering manager 116) to render an instantiated widget in accordance with the present disclosure. The processing in FIG. 11 can be initiated from block 706 (FIG. 7) to render a widget for full screen view, or from block 1004 (FIG. 10) to render a widget in order to take a snapshot of the rendered widget. In some embodiments, the mobile device can include computer executable program code, which when executed by its processor (e.g., 312, FIG. 3), can cause the mobile device to perform processing in accordance with FIG. 10. The operation and processing blocks described below are not necessarily executed in the order shown, and can be allocated for execution among one ore more concurrently executing processes and/or threads.

At block 1102, the mobile device can access the story definition information. The story definition may be updated in response to application of a filter (block 804, FIG. 8). Thus, when the widget is instantiated, it will be based on the current story definition.

At block 1104, the mobile device can access any transient filters associated with the instantiated widget. Transient filters do not update the story definition, but rather are stored locally in order not to lose their effect on the current state of the instantiated widget.

At block 1106, the mobile device can instantiate the widget using the accessed story definition and any applicable transient filters.

At block 1108, the mobile device can render the instantiated widget. The rendered widget can then be presented in a full screen view (FIG. 7), or a snapshot can be created from the rendered widget (FIG. 10).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
in a mobile data analytics application executing on a mobile computing device,
displaying a plurality of widget snapshots, the widget snapshots comprising static images depicting a current state of a corresponding widget among a plurality of widgets wherein widgets are interactive graphical data analytic elements, and wherein the plurality of widgets correspond to a story in the data analytics application, and wherein the current state of each widget is based on information corresponding to a story definition that defines the story;
in response to selection of a widget snapshot:
creating a first instance of a widget handler process to instantiate a selected widget that corresponds to the selected widget snapshot using the story definition; and
using the first instance of the widget handler process to receive input from a user interacting with the selected widget; and
in response to application of a filter on the selected widget:
deleting at least one widget snapshot that corresponds to at least one affected widget whose state is affected by the filter; and
creating a second instance of the widget handler process to re-create the deleted widget snapshot, including instantiating the affected widget using the story definition, rendering the instantiated affected widget, and taking a snapshot of the rendered instantiated affected widget to re-create the deleted widget snapshot.

2. The method of claim 1, further including, in response to application of the filter on the selected widget, signaling a context framework process and performing the deleting and creating by the context framework process.

3. The method of claim 2, wherein context framework process further updates the story definition according to the filter, wherein the affected widget is instantiated using the updated story definition.

4. The method of claim 2, wherein context framework process further creates at least one transient filter that affects the affected widget and which does not affect the story definition, wherein the affected widget is instantiated using the story definition and the transient filter.

5. The method of claim 1, wherein instantiating the selected widget includes using any transient filters associated with the widget in addition to the story definition.

6. The method of claim 1, wherein instantiating the affected widget further includes applying any transient filters associated with the affected widget in addition to using the story definition.

7. The method of claim 1, further comprising terminating the first instance of the widget handler process and creating a third instance of the widget handler process to re-create the one or more deleted widget snapshots in conjunction with the second instance of the widget handler process.

8. The method of claim 1, wherein the widget snapshot is stored as an image file.

9. The method of claim 1, wherein displaying a plurality of widget snapshots includes accessing image files stored on a storage device and displaying the accessed image files as the widget snapshots.

10. The method of claim 1, further comprising storing the snapshot of the rendered instantiated affected widget as an image file on a storage device.

11. A non-transitory computer-readable storage medium having stored thereon computer executable instructions, which when executed by a computer device, cause the computer device to:
in a mobile data analytics application executing on a mobile computing device,
display a plurality of widget snapshots, the widget snapshots comprising static images depicting a current state of a corresponding widget among a plurality of widgets, wherein widgets are interactive graphical data analytic elements, and wherein the plurality of widgets correspond to a story in the data analytics application, and wherein the current state of each widget is based on information corresponding to a story definition that defines the story;

in response to selection of a widget snapshot:
create a first instance of a widget handler process to instantiate a selected widget that corresponds to the selected widget snapshot using the story definition; and
use the first instance of the widget handler process to receive input from a user interacting with the selected widget; and in response to application of a filter on the selected widget:
delete at least one widget snapshot that corresponds to at least one affected widget whose state is affected by the filter; and
create a second instance of the widget handler process to re-create the deleted widget snapshot, including instantiating the affected widget using the story definition, rendering the instantiated affected widget, and taking a snapshot of the rendered instantiated affected widget to re-create the deleted widget snapshot.

12. The non-transitory computer-readable storage medium of claim 11, wherein the computer executable instructions, which when executed by the computer device, cause the computer device to further respond to application of the filter on the selected widget by signaling a context framework process, wherein the context framework process deletes the at least one widget snapshot and creates the second instance of the widget handler process.

13. The non-transitory computer-readable storage medium of claim 12, wherein the context framework process updates the story definition according to the filter, wherein the affected widget is instantiated using the updated story definition.

14. The non-transitory computer-readable storage medium of claim 12, wherein the context framework process creates at least one transient filter that affects the affected widget and which does not affect the story definition, wherein the affected widget is instantiated using the story definition and the transient filter.

15. The non-transitory computer-readable storage medium of claim 11, wherein the computer executable instructions, which when executed by the computer device, further cause the computer device to display the plurality of widget snapshots by accessing image files stored on a storage device and displaying the accessed image files as the widget snapshots.

16. A mobile computing device comprising:
one or more computer processors; and
a computer-readable storage medium comprising instructions for controlling the one or more computer processors to be operable to:
in a mobile data analytics application executing on the mobile computing device,
display a plurality of widget snapshots, the widget snapshots comprising static images depicting a current state of a corresponding widget among a plurality of widgets, wherein widgets are interactive graphical data analytic elements, and wherein the plurality of widgets correspond to a story in the data analytics application, and wherein the current state of each widget is based on information corresponding to a story definition that defines the story;

in response to selection of a widget snapshot:
create a first instance of a widget handler process to instantiate a selected widget that corresponds to the selected widget snapshot using the story definition; and
use the first instance of the widget handler process to receive input from a user interacting with the selected widget; and in response to application of a filter on the selected widget:
delete at least one widget snapshot that corresponds to at least one affected widget whose state is affected by the filter; and
create a second instance of the widget handler process to re-create the deleted widget snapshot, including instantiating the affected widget using the story definition, rendering the instantiated affected widget, and taking a snapshot of the rendered instantiated affected widget to re-create the deleted widget snapshot.

17. The apparatus of claim 16, wherein the computer-readable storage medium further comprises instructions for controlling the one or more computer processors to be operable to further respond to application of the filter on the selected widget by signaling a context framework process, wherein the context framework process deletes the at least one widget snapshot and creates the second instance of the widget handler process.

18. The apparatus of claim 17, wherein the context framework process updates the story definition according to the filter, wherein the affected widget is instantiated using the updated story definition.

19. The apparatus of claim 17, wherein the context framework process creates at least one transient filter that affects the affected widget and which does not affect the story definition, wherein the affected widget is instantiated using the story definition and the transient filter.

20. The apparatus of claim 16, wherein the computer-readable storage medium further comprises instructions for controlling the one or more computer processors to be operable to display the plurality of widget snapshots by accessing image files stored on a storage device and displaying the accessed image files as the widget snapshots.

* * * * *